(12) United States Patent
Saurabh et al.

(10) Patent No.: US 12,231,377 B1
(45) Date of Patent: Feb. 18, 2025

(54) CHATBOT CONVERSATION FLOW DESIGNER

(71) Applicant: Amazon Technologies, Inc., Seattle, WA (US)

(72) Inventors: Saket Saurabh, Sammamish, WA (US); Anubhav Mishra, San Carlos, CA (US); Fnu Don Manuel, Mountlake Terrace, WA (US); Kuai Hu, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/846,747

(22) Filed: Jun. 22, 2022

(51) Int. Cl.
*H04L 51/02* (2022.01)
*G06F 40/166* (2020.01)
*G06F 40/30* (2020.01)
*G06N 5/04* (2023.01)

(52) U.S. Cl.
CPC ............ *H04L 51/02* (2013.01); *G06F 40/166* (2020.01); *G06F 40/30* (2020.01); *G06N 5/04* (2013.01)

(58) Field of Classification Search
CPC ....... H04L 51/02; G06F 40/166; G06F 40/30; G06N 5/04
See application file for complete search history.

(56) References Cited

U.S. PATENT DOCUMENTS

| | | | |
|---|---|---|---|
| 2018/0090141 A1* | 3/2018 | Periorellis | G10L 15/1815 |
| 2020/0334568 A1* | 10/2020 | Liden | G06F 3/0482 |
| 2021/0312904 A1* | 10/2021 | Shukla | G06F 16/3329 |
| 2021/0334071 A1* | 10/2021 | Luo | H04L 51/02 |

* cited by examiner

*Primary Examiner* — Soe Hlaing
(74) *Attorney, Agent, or Firm* — Nicholson De Vos Webster & Elliott LLP

(57) ABSTRACT

Techniques for updating a chatbot definition are described. In some examples, this updating includes receiving an edit to intent characteristics for a stage of a plurality of stages in a chatbot flow, identifying a stage to modify based on at least the received edit, identifying, for the stage, a default update rule based on the chatbot definition, and updating the stage in the chatbot definition by inferring a next step according to one or more rules for the stage including the identified default update rule.

20 Claims, 18 Drawing Sheets

INTENT:BOOKHOTEL

► CONVERSATION FLOW   803

▼ INTENT DETAILS   805

INTENT NAME

| NAME | 807 |

DESCRIPTION

| DETAILS | 809 |

▼ CONTEXTS   811

INPUT CONTEXTS

| CHOOSE CONTEXTS |

OUTPUT CONTEXTS

| CHOOSE CONTEXTS |

SAMPLE UTTERANCES   821

| FILTER | 823 |    | SORT 825 ▼ |

| CHOOSE BOOK A HOTEL |

| I WANT TO MAKE A HOTEL RESERVATION |

| BOOK A {NIGHTSVALUE} NIGHT STAT IN {LOCATIONNAME} |

|  |  ADD 827 |

INITIAL RESPONSE   831

► RESPONSE TO ACKNOWLEDGE THE USER'S REQUEST   833

*FIG. 8(A)*

CHATBOT CONVERSATION FLOW DESIGNER

BACKGROUND

A chatbot is software that may use machine learning and/or natural language processing to understand a user's requests and automate responses to the user. Chatbots are typically used to automate the finding of needed information through the request/response interaction. The interaction may be text, audio, or a combination thereof.

BRIEF DESCRIPTION OF DRAWINGS

Various examples in accordance with the present disclosure will be described with reference to the drawings, in which:

FIGS. 8(A)-(B) illustrate examples of a graphical user interface to define an intent for a bot using a chatbot developer or chatbot developer service.

DETAILED DESCRIPTION

The present disclosure relates to methods, apparatus, systems, and non-transitory computer-readable storage media for building a chatbot.

In existing chatbot development services conversation flow is largely linear with no easy support for alternative dialog flows. This limits the ability to design bots that can take different conversation paths as each of those paths has to be hardcoded. Any changes to the flow (e.g., removal or alteration of a path) have to be hardcoded. In chatbots with hundreds if not thousands of potential paths it is not feasible to do this hardcoding.

Detailed herein are examples of a service for chatbot design and dialog management support that utilizes conditionals. Conditionals are defined as an "if this then that" construct which bot authors can use introduce alternate conversation flows at specific points in a conversation flow. At the very high level, conditionals comprise of a set of conditions which can lead to the execution of specific dialog flows called branches when the corresponding condition is evaluated to true. For example, consider the use of conditional branching in an order lunch bot. After an initial response, a conditional may have conditions such as "if time<11 AM Action: Play message "Too early to order lunch. Please try after 11 AM" then Jump to End conversation" or "if time> 3 PM Action: Play message "Too late to order lunch. Please try tomorrow between 11 AM and 3 PM" then Jump to End conversation" or a default path such as "Jump to slot elicitation: mainItem."

Figure 1:
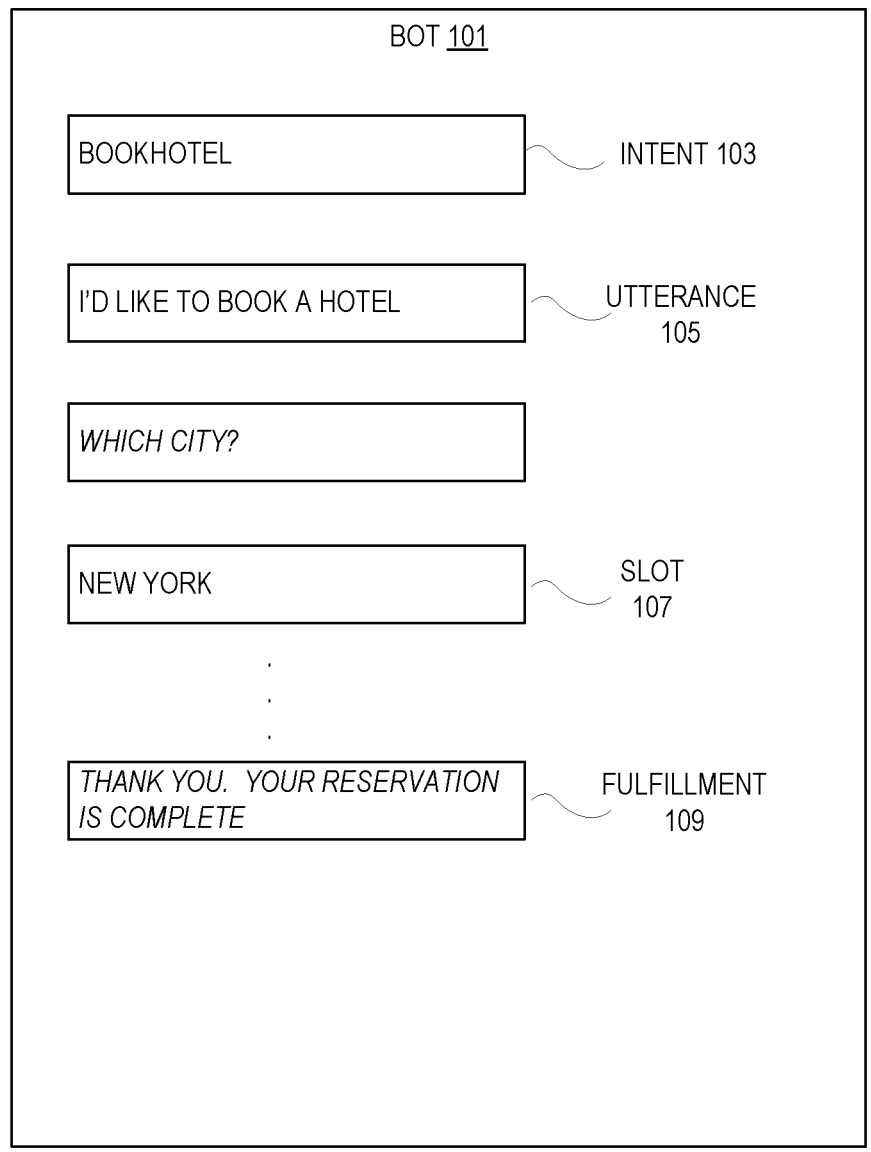
FIG. 1 illustrates an example of a chatbot usage.

FIG. 1 illustrates an example of a chatbot usage. In this example, the bot 101 is used to intake user input (such as utterances) and provide responses to the input (shown in italics). In this example, the intent 103 of the bot 101 is to book a hotel. An intent represents an action to take in response to natural language input. In particular, an intent is a task/goal for an agent (such as a chatbot) that is necessary in order to fulfill a user's request. Intents may use (1) custom slot types defined specifically for a domain (e.g., a "book_hotel" slot for a trip planning domain) or (2) built-in slot types that can express intents that are general enough to be applied across many domains (e.g., a "greeting" slot which can be applied to almost any domain). A slot is a list of values used to train a machine learning model to recognize values for a slot (e.g., the value "New York" in this example).

A user provides an utterance 105 in the form of a spoken or typed phrase that invokes the intent 103. Slots 107 are input data required to fulfill an intent. As such, slots 107 represent parameters that have to be asked and assigned values in order to fulfill an intent in a user's request. For example, in order to successfully complete a book_hotel reservation, an agent would require information about multiple slots such as, for example, the "start_date" and the "end_date" (which represent the check-in and check-out dates), the "location_to" (which represents the place where the user is traveling to) and other preferences of the user like "price_range." The list of possible values these slots 107 may be restricted to include (1) custom values (for the example dataset above, "location_to" can be the name of a US city such as, for example, San Jose, Seattle, etc.) or (2) built-in types, such as builtin.date for the slot labeled "start_date" or "end_date."

Finally, the bot 101 provides an indication of fulfillment.

At the start of the conversation, the bot expects a generic utterance during an intent elicitation phase to understand the intent of the user. These utterances may have a few domain specific words. Once the intent is detected, the bot enters into a slot elicitation mode to fill a specific slot value. Slot values typically contains a catalog of values such as names, medications, business names, etc.

For example, while responding to a bot prompt "How may I help you?", the user can say "I want to get tested for disease X" to express their intent during intent elicitation. These utterances contain domain specific terminology such as "disease X" that needs to be accurately transcribed, so that user's intent is appropriately detected. Based on the intent of the user, the bot can seek information on existing medication, symptoms and doctor names. Each information is captured in a slot and can span a finite list of value. During slot elicitation, the transcription needs to be focused on the acceptable list of values for the slot. As described in the example, users have specific words/phrases which are expected with a very high probability in the speech utterances at specific stages of the interaction. Once users provide these words/phrases, we are expected to also recognize those with a high probability based on the interaction state.

The actions that the chatbot may take are sometimes called dialog actions. In particular, a dialog action describes the next action that the bot should take in its interaction with the user and provides information about the context in which the action takes place. A dialog action may have several different components such as a name of an intent, a message to be shown to a user, a map of slots that have been gathered and their values, a slot to elicit, and an indication of a type of action to use such as: 1) confirm intent which is to ask the user if the intent is complete and ready to be fulfilled; 2) close which indicates that there is not response from a user; 3) delegate which means some entity other than the chatbot makes the decision as to the next action; 4) elicit intent wherein the next action is to determine the intent that the user wants to fulfill; and/or 5) elicit slot wherein the next action is to elicit a slot value from the user.

Figure 2:
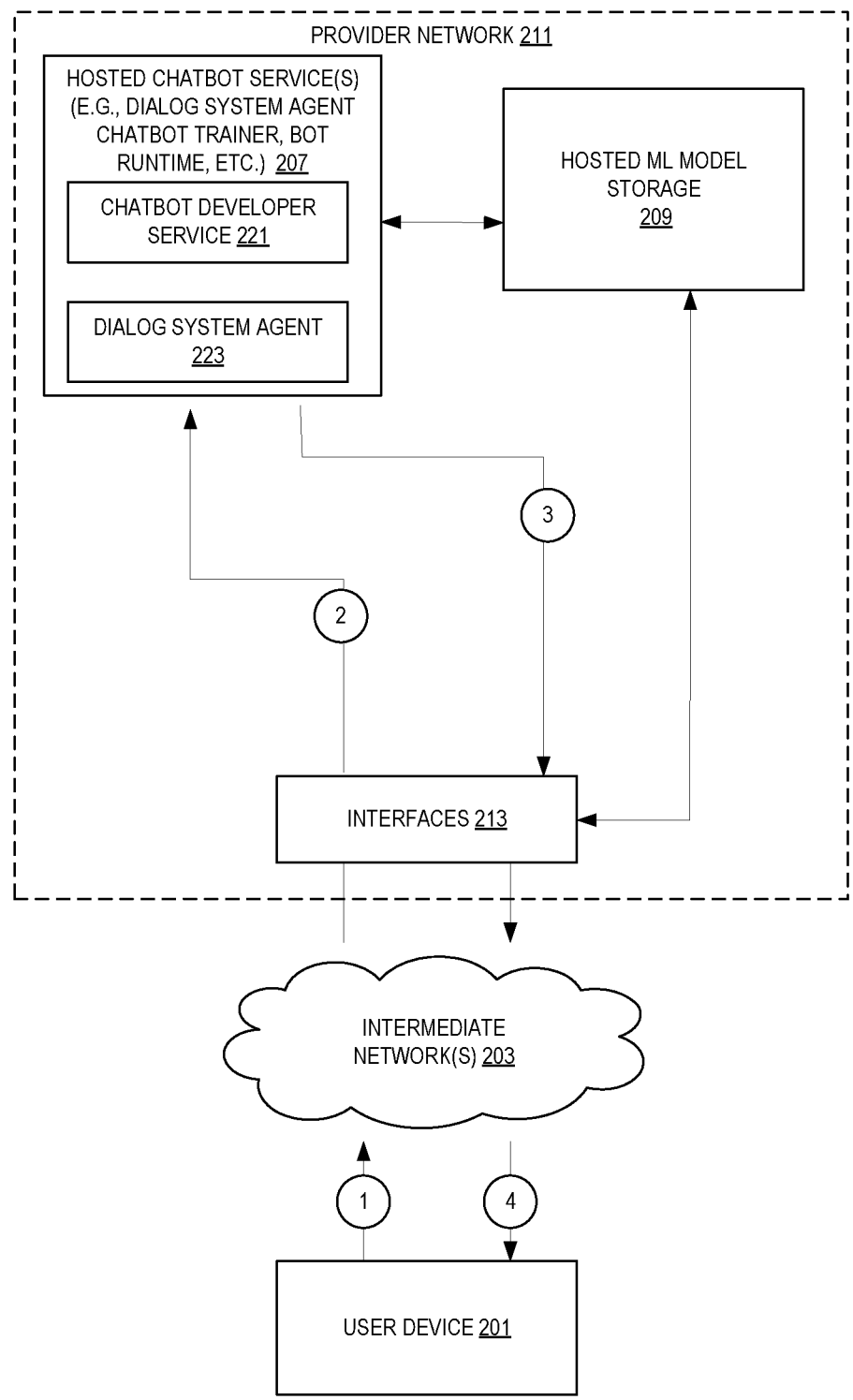
FIG. 2 illustrates examples of a system that includes chatbot services.

FIG. 2 illustrates examples of a system that includes chatbot services. As shown, a provider network 211 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. for at least NLU. These and other computing resources may be provided as services, such as a hardware virtualization service that can execute compute instances, a storage service that can store data objects, etc. The users (or "customers") of provider networks 211 may utilize one or more user accounts that are associated with a customer account, though these terms may be used somewhat interchangeably depending upon the context of use. User devices 201 may interact with a provider network 211 across one or more intermediate networks 203 (e.g., the internet) via one or more interface(s) 213, such as through use of application programming interface (API) calls, via a console implemented as a website or application, etc. The interface(s) 213 may be part of, or serve as a front-end to, a control plane of the provider network 211 that includes "backend" services supporting and enabling the services that may be more directly offered to customers.

A provider network 211 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 211 can use one or more user accounts that are associated with a customer account, though these terms can be used somewhat interchangeably depending upon the context of use. Users can interact with a provider network 211 across one or more intermediate networks 203 (e.g., the internet) via one or more interface(s) 213, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 213 can be part of, or serve as a front-end to, a control plane of the provider network 211 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to an AZ of the cloud provider network via a publicly accessible network (e.g., the Internet, a cellular communication network), e.g., by way of a transit center (TC). TCs are the primary backbone locations linking customers to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 211 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

In this illustration, the provider network 211 provides several chatbot related services 207 including, for example, chatbot development 221, NLU services, ASR services (including support for custom vocabs), support for providing a dialog system agent 223, dialog training data generation, machine learning (ML) model training (e.g., part of bot training), etc. Note that some of the services may be combined. For example, ASR and/or NLU may be a part of a dialog system agent.

An example of a communication is an oral "utterance" to be handled by the bot. The hosted ML service 207 hosts ML models for different entities on a shared fleet of physical and/or virtual hosts. The hosted ML models may be custom (for example, user provided) or provided by the service. The bot may call other hosted ML services 207. Hosted ML model storage 209 stores models for NLU, ASR, bot definitions, configurations, support for hosting a dialog system agent, dialog training data generation, and/or ML model training.

As shown, at circles 1 and 2, a user device 201 communicates with the provider network 211 via intermediate networks 203 and interfaces 213. In particular, the user device 201 communicates with a hosted ML service 207 to request a develop a chatbot using chatbot developer service 221. The developed chatbot may take the form of a bot definition capable of being understood by the dialog system agent.

The results of the interaction with the bot are returned at circle 3 and then forwarded back to the user device 201 as needed in circle 4.

Figure 3:
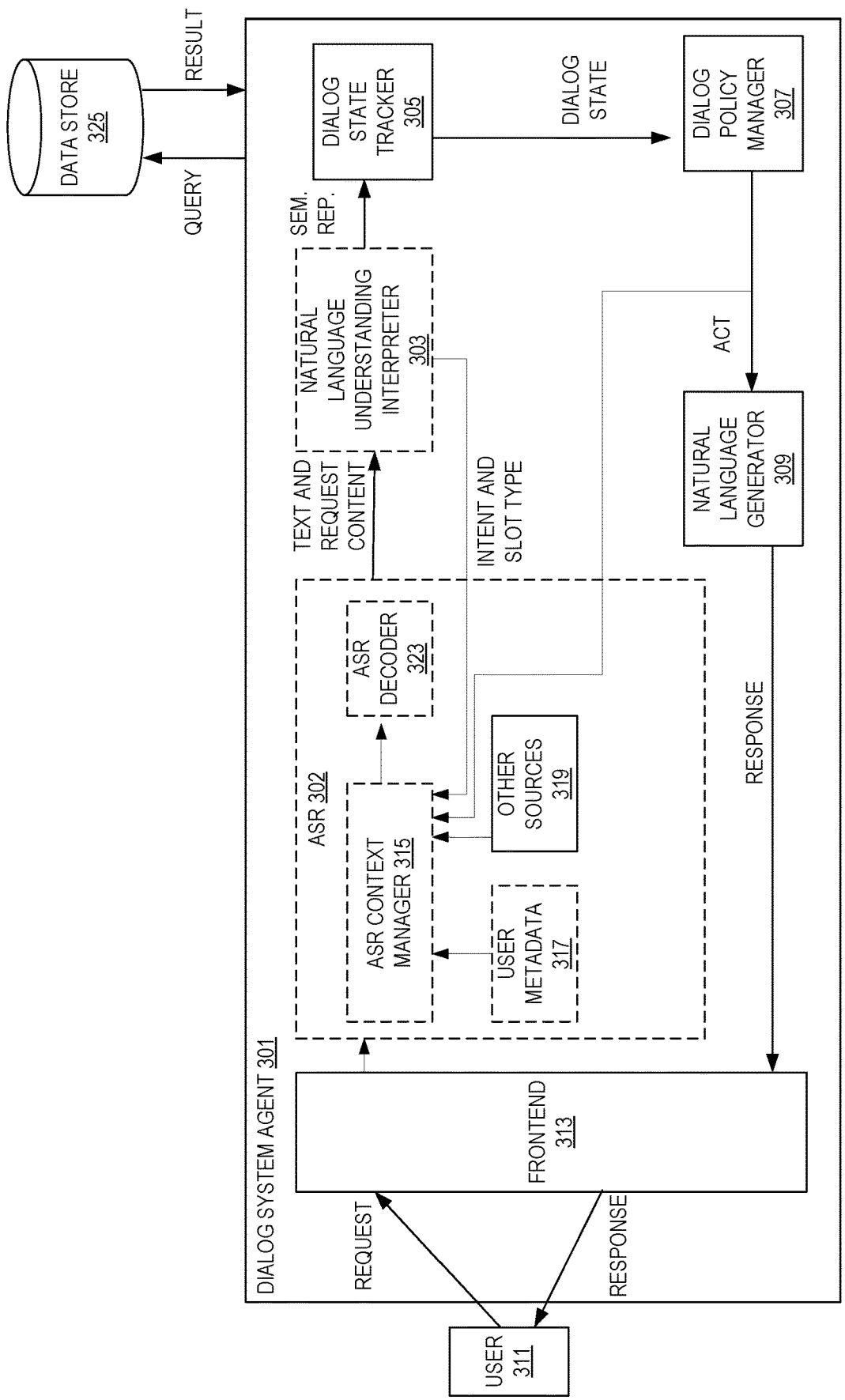
FIG. 3 illustrates examples of a dialog system agent.

FIG. 3 illustrates examples of a dialog system agent. In some examples, the dialog system agent is used to implement a chatbot. The dialog system agent 301 is typically a collection of software components stored in memory and executed by one or more processors. In some examples, one or more of the components are models and/or are a part of a larger model (such a rule based or machine learning).

As illustrated, the dialog system agent 301 includes many individual components, each responsible for performing a specific sub-task. A frontend or orchestrator 313 handles incoming requests and outgoing responses with a user 311. These requests may include audio and/or text from the user. Note that while components are shown as being connected (e.g., ASR 302 to Natural Language Understanding (NLU) interpreter 303) in some examples the frontend 313 coordinates the interactions and may pass the result of one component to the next component.

When the request includes audio, an ASR component 302 predicts text from the audio and passes the text and content of the request to the NLU interpreter 303. The ASR component 302 may include one or more sub-components. An ASR context manager 315 determines if a default artifact should be passed to an ASR decoder 323 to generate text or if a custom artifact (such as a weighted graph for example a weighted finite state transducer (wFST)) should be passed to the ASR decoder 323 to generate text. The ASR context manager 315 makes this determination based on one or more of user metadata (e.g., location, time, etc.), a custom vocabulary definition (scope and terms), dialog act (e.g., intent, slot type, and/or action type (e.g., confirm intent, elicit intent, or elicit slot) from the NLU interpreter 303, and/or other sources such as crawled websites, etc. In some examples, an artifacts index is also consulted. For example, for elicit intent the artifact in the artifacts index for "ElicitIntent" includes sample utterances and a custom vocabulary used in those utterances.

The NLU interpreter 303 maps a user's 311 utterance, provided image, or response text into a semantic representation. A Dialog State Tracker (DST) 305 updates its belief of the state of the system based on a history of the dialog (based on queries and results from the data store 325) and the semantic representation. A Dialog Policy Manager (DPM) 307 predicts the next action given the output of the DST 305.

In some examples, a dialog policy used by DPM 307 is a linear flowing conversation which contains up to five conversation phases: 1) Initial response stage (providing an initial message back to the user), (2) Slot Elicitation (2) collect the details from the user. This stage will repeat for each slot.), (3) Confirm intent (the user confirms the details), (4) Fulfillment perform action(s) for the user), and (5) Closing (final words before the intent is complete)

That is in the slot elicitation phase, bots elicit one slot a time in the order of their slot priority. Once all the required slots are elicited, the conversation moves to a ConfirmIntent step. In some examples these rules of the conversation flow today are implicit and not a part of the bot design and can result in unintended conversation paths, making it difficult to design a conversation where some slots are expected to be elicited only in certain paths and under certain conditions. When designing such conversations, it may be critical to have better control on the flow of conversation.

In some examples, the DPM 307 evaluates the bot state and determines the next step at runtime as opposed to using the next steps defined in the bot definition and/or ML artifacts. In some examples, the ambiguity around runtime behavior of the DPM 307 is removed to provide more deterministic view of conversation paths at bot build-time. In particular, in some examples, support for a configurable 'Next Step' is added to every conversation stage. This allows bot authors to define a deterministic flow and not rely on implicit rules of the dialog policy. This explicit representation of conversation design will provide more clear view of all possible conversation paths to bot authors when building the bots. When configuring "Next Step" users are able to provide bot responses corresponding to each transition and also set values to session attributes and slot.

A Natural Language Generator (NLG) 309 converts the predicted action into text. In some instances, these components are typically trained independent of each other which may result in sub-optimal performance. However, in examples detailed herein, these components of the dialog system agent 301 are trained, end-to-end, together.

Figure 4:
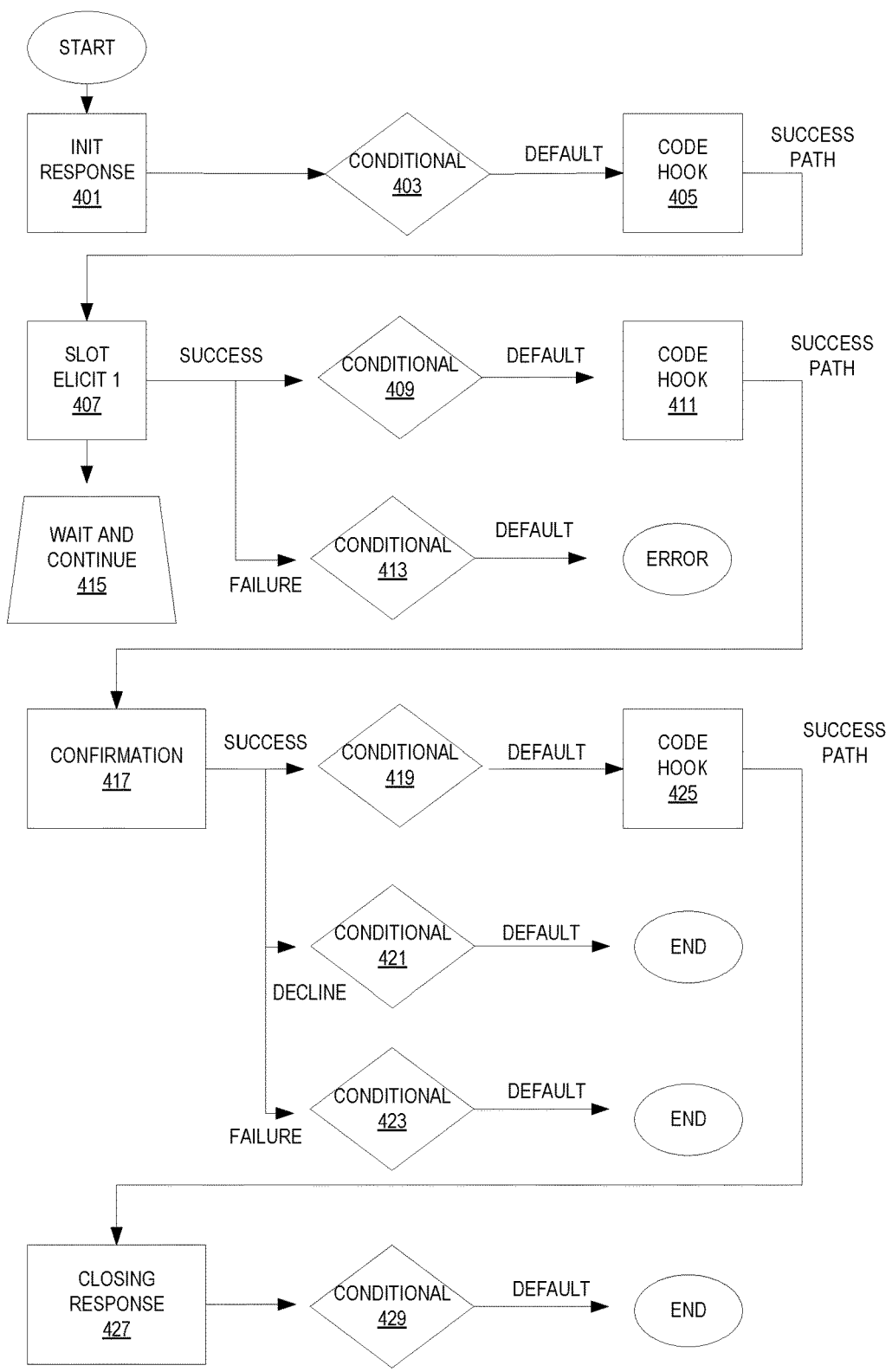
FIG. 4 illustrates examples of a bot conversation flow that utilizes the five steps discussed above.

FIG. 4 illustrates examples of a bot conversation flow that utilizes the five steps discussed above. In particular, this flow has five distinct dialog stages which will occur in sequence. Note that in some examples one or more of these stages will not be present. For example, a confirmation stage may be inactive, etc.

At an initial response stage includes an initial response 401 which is an initial message that is played back to the user such as "I can help you with ordering lunch." The initial response stage has a conditional 403 and dialog code hook 405 both being optional and, in some examples, disabled by default. A dialog code hook specifies a function that verifies requests to a bot or fulfills a user's request to a bot.

The initial response stage is followed by a slot elicitation stage to collect the details from the user. This stage will repeat for each required slot (e.g., there will be a slot elicitation 2 for a different slot, etc.). This stage consists of slot elicitation prompt 407 (e.g., What do you want for lunch?), a wait stage 415 to await input, a slot capture success or failure textual response, and/or one or more conditionals (e.g., conditionals 409 and 413) after either a success or failure response (in some examples, conditionals are disabled by default), and a dialog code hook invocation 411 (in some examples, this is disabled by default). In some examples, the dialog code hook 411 is invoked during slot elicitation retries and after slot elicitation success.

After N slot elicitation stages, a confirmation stage typically follows when enabled. The confirmation stage allows a user to confirm details. In some examples, this stage includes a confirmation prompt 417 (such as "Okay, can I go ahead and order a large pizza for you?"), one or more conditionals 419, 421, 423 associated with an indication of success (user responds positively), decline (user responds negatively), and failure (user does not understand) response respectively, and/or a dialog code hook 425. In some examples, this code hook comprises a fulfillment stage to perform one or more actions for the user.

In some examples, the final stage is a closing response stage that includes a final response 427 before the intent is complete and/or a conditional 429.

In some examples, retry logic is provided in the DPM 307 to retry when a dialog code hook is unsuccessful.

Figure 5:
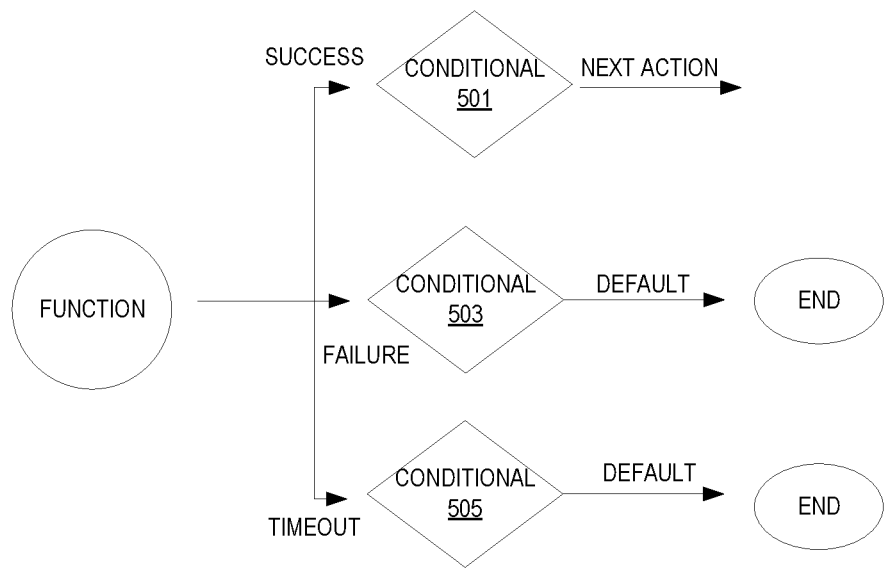
FIG. 5 illustrates examples of dialog code hook invocations.

FIG. 5 illustrates examples of dialog code hook invocations. As shown, the function is performed and can be a success (causing a success response such as "Your order was placed successfully."), a failure (causing a failure response such as "Sorry we could not process your order. <Jump ta conditionals after to check the session attributes for error reason and read it to the user>"), and/or a timeout (causing a timeout response such as "Sorry could not reach the kitchen to place the order. Please visit https://orderlunch.com to place an order online."). Each of these paths can have a conditional (shown as conditionals 501, 503, and 501) along with a default action upon the condition being satisfied.

At each of the above responses (or conversation steps), the bot developer will have the ability to specify a next action to define the conversation flow. In some examples, a next action comprises two action type: 1) set actions that set values to slot values and/or session attributes) and a next step which specifies the next conversation step (e.g., jump to elicitSlot).

Each conversation step has an explicit next step either auto updated during creation or explicitly set by the bot developer. In some examples, the list of supported next steps may include, but are not limited to: 1) Jump to Initial Response; 2) Jump to Slot Elicitation; 3) Jump to Confirmation Prompt; 4) Jump to Fulfillment; 5) Evaluate Condition; 6) Execute dialog code hook; 7) Transfer to Intent; 8) Transfer to Intent at Slot; 9) End Conversation; 10) Elicit Intent; and 11) Jump to Error block.

In some examples, the chatbot developer service 221 will automatically update a default next step while the bot is being created/edited. In some examples, the chatbot developer service 221 will automatically update the default next step at build and import/export workflows. Auto updating updates the next steps for all conversation steps except for the conditional non-default branches. For conditionals, auto updating will be done only for the default branch.

In some examples, optional slots do not have next actions. No other action points to optional slots either. Optional slots are limited to first turn utterance use cases.

In some examples, active/inactive toggle is supported by the chatbot developer service 221 for one or more of the following dialog stages/conversation steps: 1) Confirmation Prompt; 2) Fulfillment stage; 3) Closing response; 4) Conditional blocks; and/or 5) Dialog code hook blocks.

Figure 6:
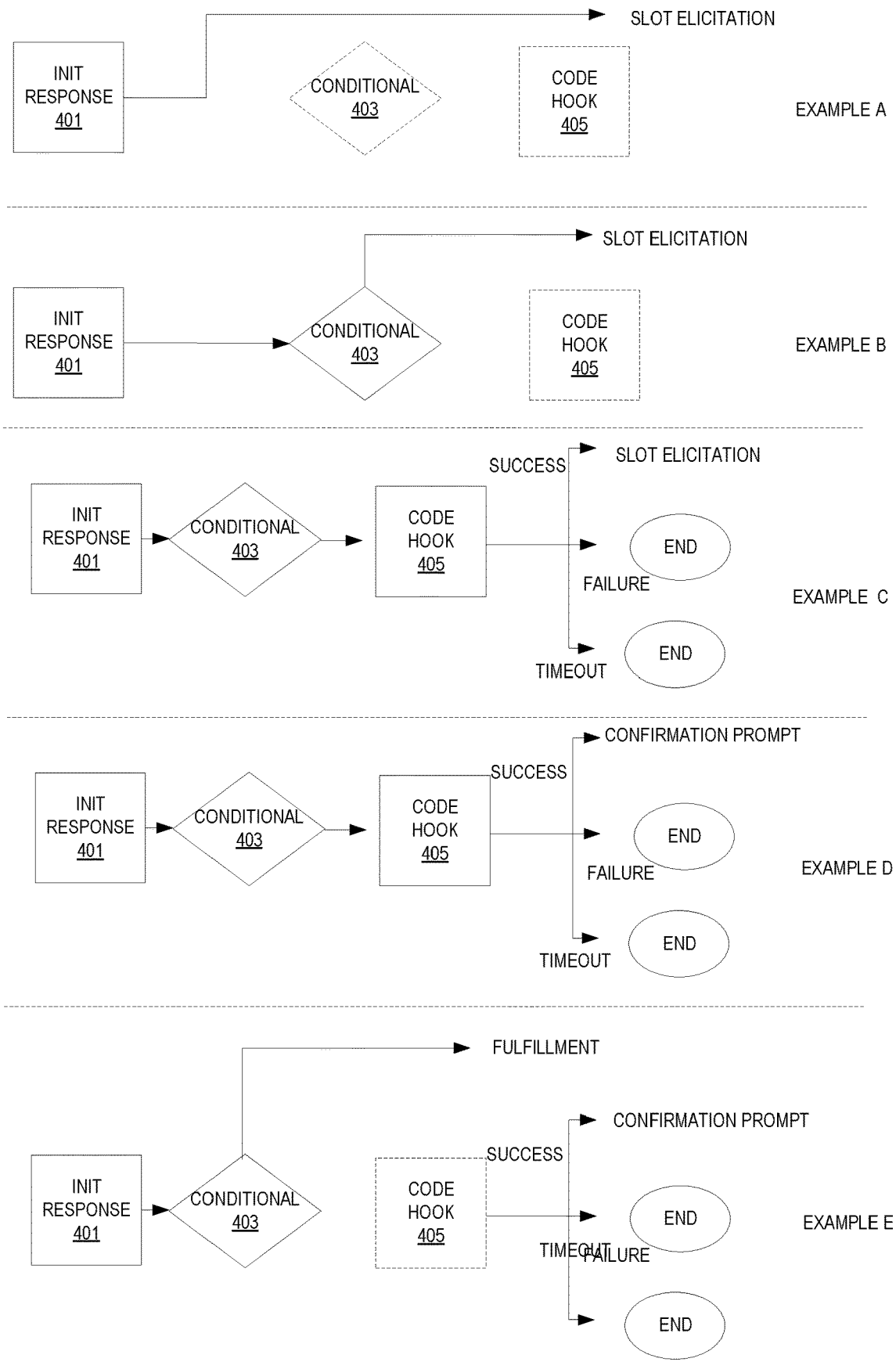
FIG. 6 illustrates examples of auto updating of a next action using a user interface during bot development.

FIG. 6 illustrates examples of auto updating of a next action using a user interface during bot development. Note that the numbering and flows is the same as FIG. 4 and these examples deal with the initial response stage.

As noted above, in some examples, each conversation step will contain a conditional and dialog code hook invocation (and typically, both are disabled by default). When conditional 403 and dialog code hook 405 are disabled the next action after initial response 401 will be Jump to slot elicitation: <slotWithHighestPriority> as shown in example A.

When a conditional 405 is enabled, the next action of the Initial Response conversation step is changed to "Evaluate Conditional" as shown in example B. In some examples, the next step of the default branch of the conditional block to is changed to the next active step in the flow (in this example, the next step is "Jump to slot elicitation").

If the bot developer enables the dialog code hook invocation 405, the conditional 403 default branch will jump to dialog code hook 405 and the dialog code hook's 405 success response block will point to a next action of slot elicitation as shown in example C. The failure and time out responses will be automatically updated with "End conversation" as the next action.

If the bot developer changed the dialog code hook success response to "Jump to Confirmation" conversation flow will look like example D.

If the dialog code hook 405 was marked inactive, the conditional 403 default branch is updated to point to slot elicitation as shown in example E. In some examples, the success response of the dialog code hook is still kept for when it is made active again. This way there is not a loss of customer set next actions when a block is marked inactive.

Figure 7:
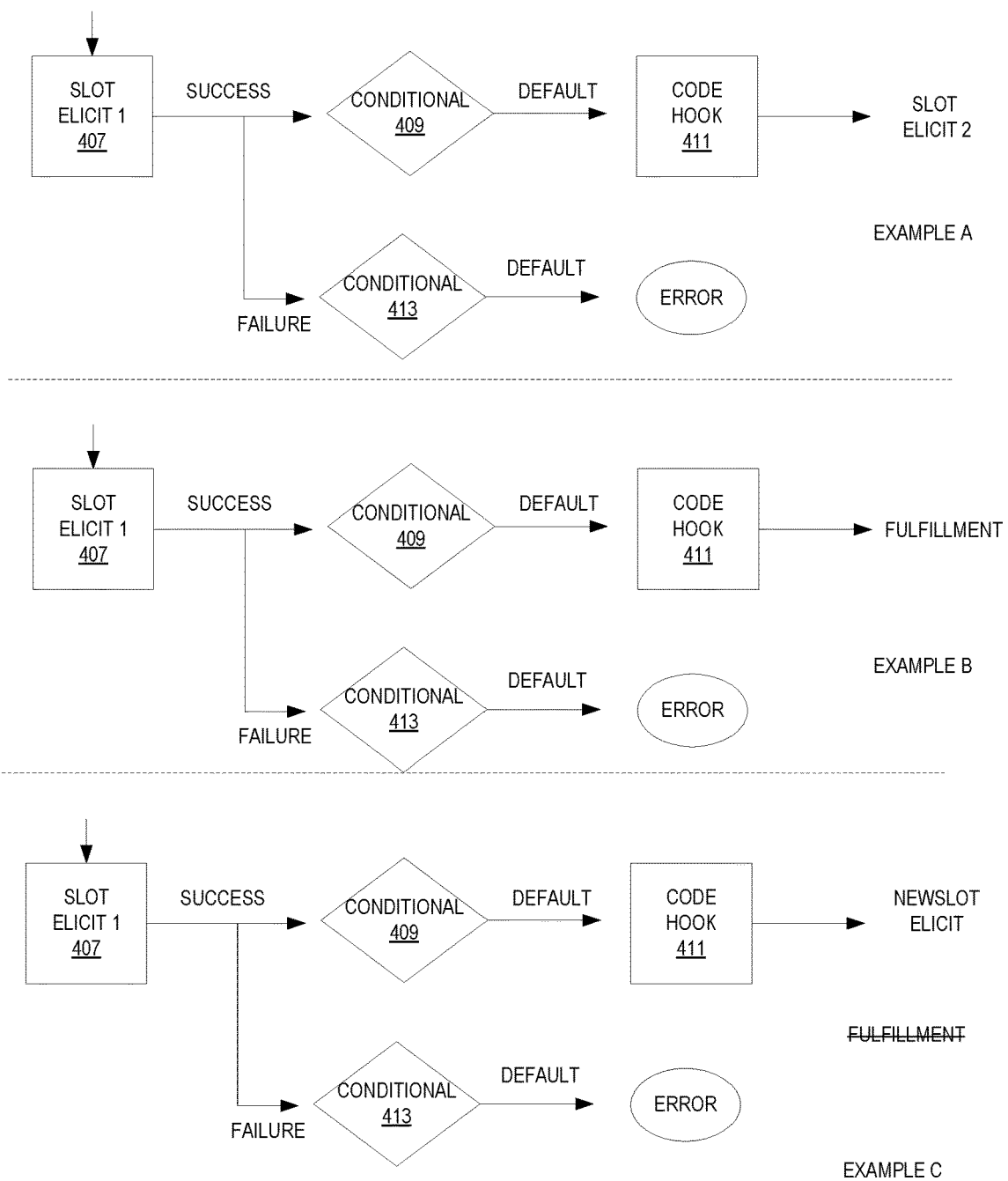
FIG. 7 illustrates examples of auto updating of a next action using a user interface during bot development.

FIG. 7 illustrates examples of auto updating of a next action using a user interface during bot development. Note that the numbering and flows is the same as FIG. 4 and these examples deal with the slot elicitation response stage. While auto populating next actions, it is important that to not override any actions explicitly set by the bot developer. However, in some examples it is not tracked explicitly if an action was set by the customer or automatically updated. To ensure user set next actions are not overwritten, in some examples automatically update is only performed when 1) the next action is missing or 2) when the next action at a conversation step is the default automatically updated one.

As shown, a slot elicitation 407 has two responses-slot capture success response and slot capture failure response. There are two conditionals 409 and 413 enabled at both responses and the dialog code hook 411 for the slot elicitation dialog stage enabled as shown in example A. Note that Elicit Slot2 is the next step assuming Slot2 is the next slot as per slot priority order.

In example B, a slot was added between Slot 1 and Slot 2, for example Slot 1>SlotNew>Slot 2 (in decreasing slot priority). If this was a clean slate the dialog code hook 411 would point to Jump to ElicitSlot: SlotNew. However, in this example the dialog code hook's 411 next action is Jump to Fulfillment which is different from its default next action. It can be understood from this that the developer has a next action set explicitly at the dialog code hook 411 and thus will not update the next action of the dialog code hook 411.

The only time the next action of the dialog code hook 411 is updated here is when the fulfillment block was marked inactive as shown in example C. In this case the flow from the code hook 411 is updated to jump to the next slot with the highest priority. In this case SlotNew.

Figure 8B:
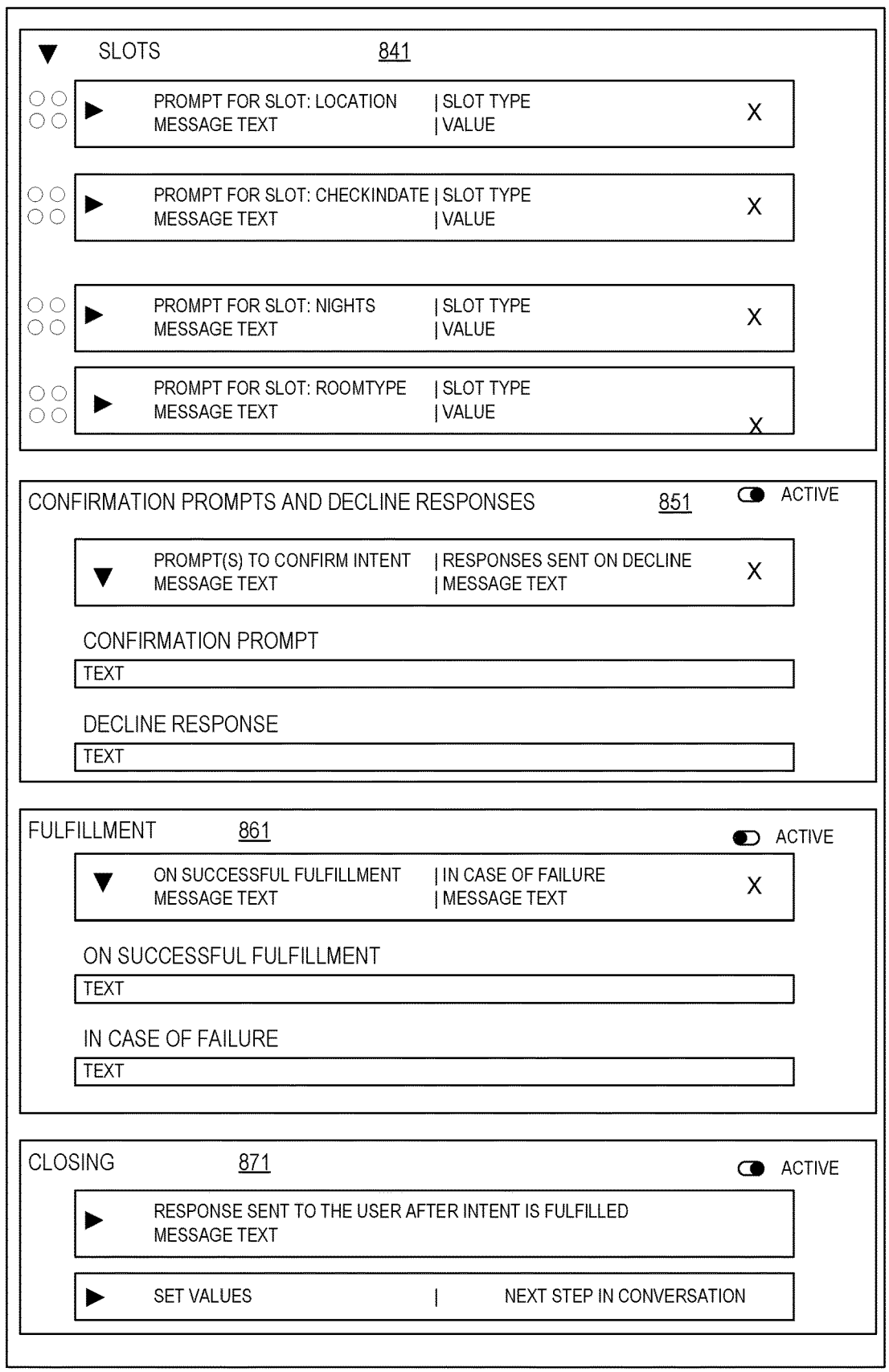

FIGS. 8(A)-(B) illustrate examples of a graphical user interface to define an intent for a bot using a chatbot developer or chatbot developer service. Note that not all aspects are present in every example. In some examples, the graphical user interface graphically illustrates at least the chatbot definition and edits through the graphical user interface are made to the chatbot definition.

As shown in the graphical user interface (GUI) a user may use conversation flow section 803 to see how a dialog with the bot may look. In some examples, this flow is in the form of a flow diagram where different sections of the conversation are selectable to jump to that section of the intent editor.

An intent details section 805 allows a user to give the intent a name through field 807 and description to help identify the purpose of the intent through field 809.

A contexts section 811 allows a user to set input and output contexts for the intent. A context is a state variable associated with an intent. An output context is set when an intent is fulfilled. An intent with an input context can only be recognized with the context is active. An intent with no input contexts can always be recognized. Each context has a list of parameters that are maintained in the session. The parameters are the slot values for the fulfilled intent. You can use these parameters to pre-populate slot values for other intents. In some examples, intents can be triggered based on context.

A sample utterances section 821 allows a user to provide phrases that it is expected users will use to use to trigger an intent. These phrases are then generalized by the chatbot developer or chatbot developer service.

An initial response section 831 allows a user to define a response to acknowledge a user's request via field 833.

A slots section 841 allows a user to define the slots, or parameters, required to fulfill the intent. Each slot has a type that defines the values that can be entered in the slot. In some examples, a user may choose between custom slot types and a built-in slot type.

A confirmation prompts and declination responses section 851 allows a user to provide responses used to end the conversation with a user and to confirm or decline fulfillment of the intent. The confirmation prompt asks the user to review slot values. For example, "I've booked a hotel room for Friday. Is this correct?" The declination response is sent to the user when they decline the confirmation.

A fulfillments section 861 allows a user to define a response sent to the user at the start of fulfillment and periodically while the fulfillment is in progress. For example, "I'm changing your password, this may take a few minutes" and "I'm still working on your request." Additionally, the fulfillments section 861 allows a user to define post fulfillment status such as what response to send to the user when an intent is fulfilled or in case of failure. In some examples, the message to be sent is one of a success message, a failure message, and a timeout message. For example, if the fulfillment succeeds, one can send "I've changed your password." If the fulfillment doesn't succeed, one can send a response with more information, such as "I couldn't change your password, contact the help desk for assistance." If the fulfillment takes too long to process and exceeds the configured timeout period, one can send a message informing the user, such as "Our servers are very busy right not. Try your request again later."

A closing response section 871 allows a user to define a response sent to the user after the intent is fulfilled and all other messages are played. For example, a thank you for booking a hotel room. Or it can prompt the user to start a different intent, such as "Thank you for booking a room, would you like to book a rental car?"

As illustrated, one or more sections may be made active (a part of the chatbot) or inactive. Note the illustration is not meant to imply that only the particular sections have this capability or that they do in all examples.

Figure 9:
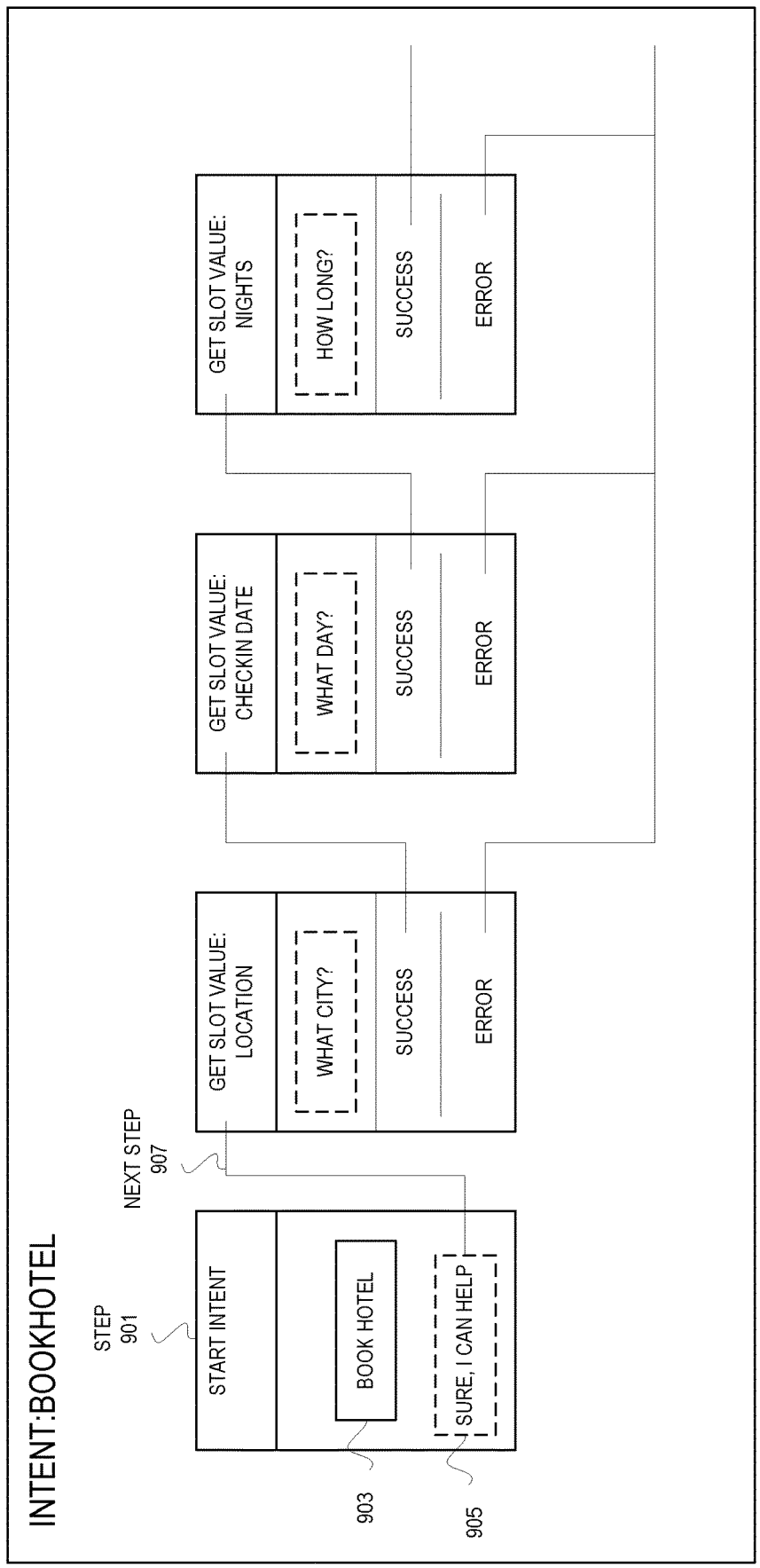
FIG. 9 illustrates examples of a graphical user interface to define an intent for a bot using a chatbot developer or chatbot developer service.

FIG. 9 illustrates examples of a graphical user interface to define an intent for a bot using a chatbot developer or chatbot developer service. In some examples, the graphical user interface graphically illustrates at least the chatbot definition and edits through the graphical user interface are made to the chatbot definition.

In this illustration, each step 901 is illustrated as a connectable shape. As shown, a user may define user text 903, bot response text 905 (shown as dashed boxes), connections between steps for success, error, timeout, etc. using a next step 907 connector, etc.

At an application programming interface (API) level, in some examples, auto updating of next actions is performed during build and import workflows. Users create intents and slots without next actions. The next actions are updated if the next action is missing. Existing next actions are not overwritten. For overriding any existing next actions, a user's intent should be known.

Figure 10:
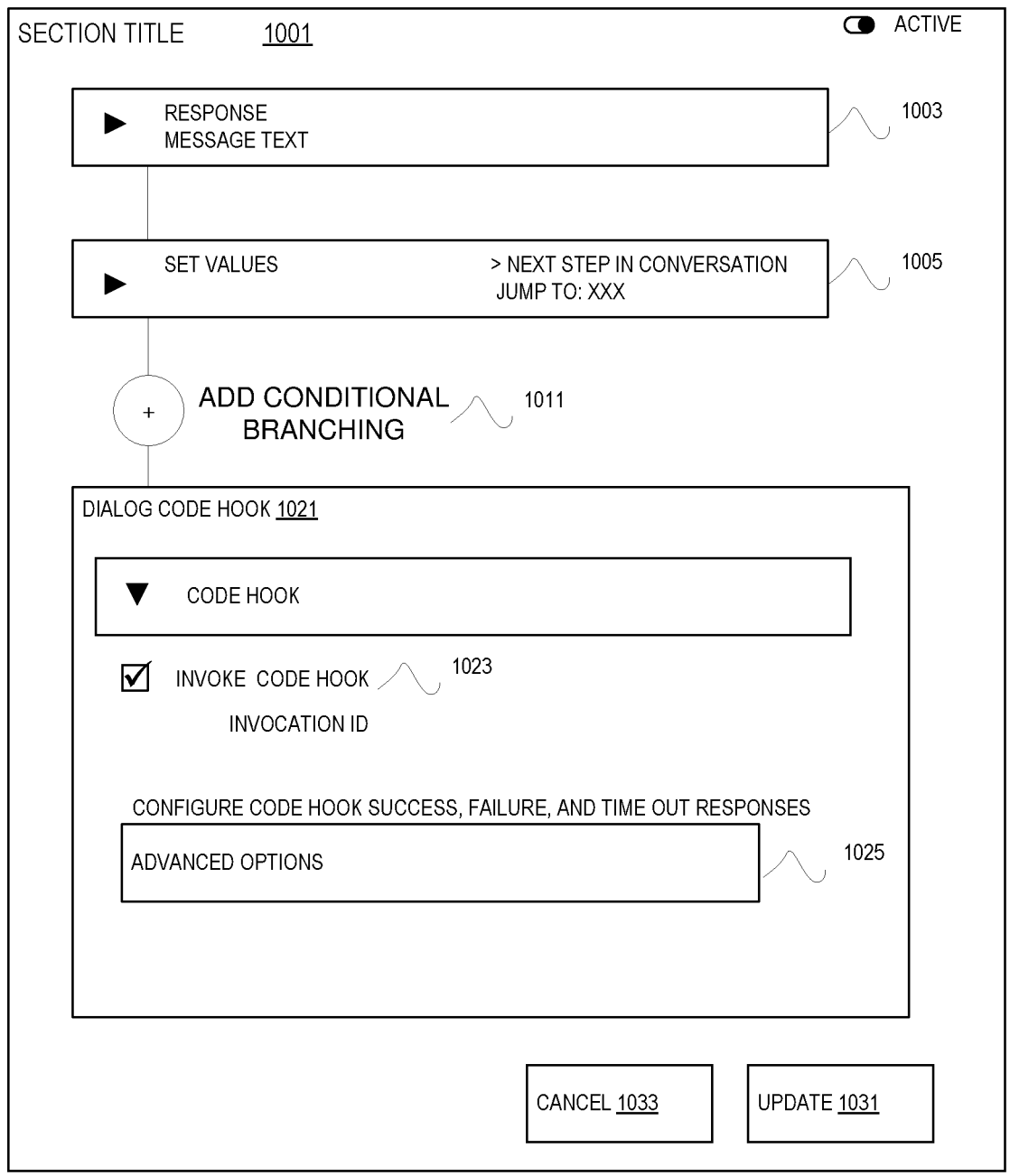
FIG. 10 illustrates examples of a generic section of GUI to edit an intent.
Figure 11:
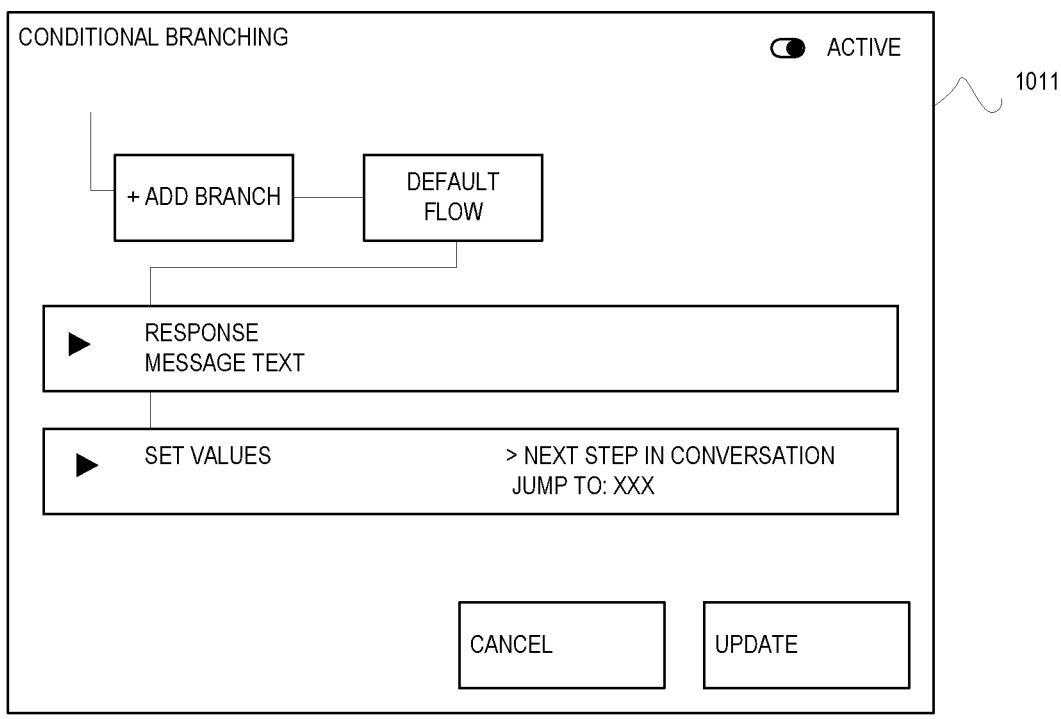
FIG. 11 illustrates examples of a conditional branching GUI to edit conditional branching of an intent.
Figure 12:
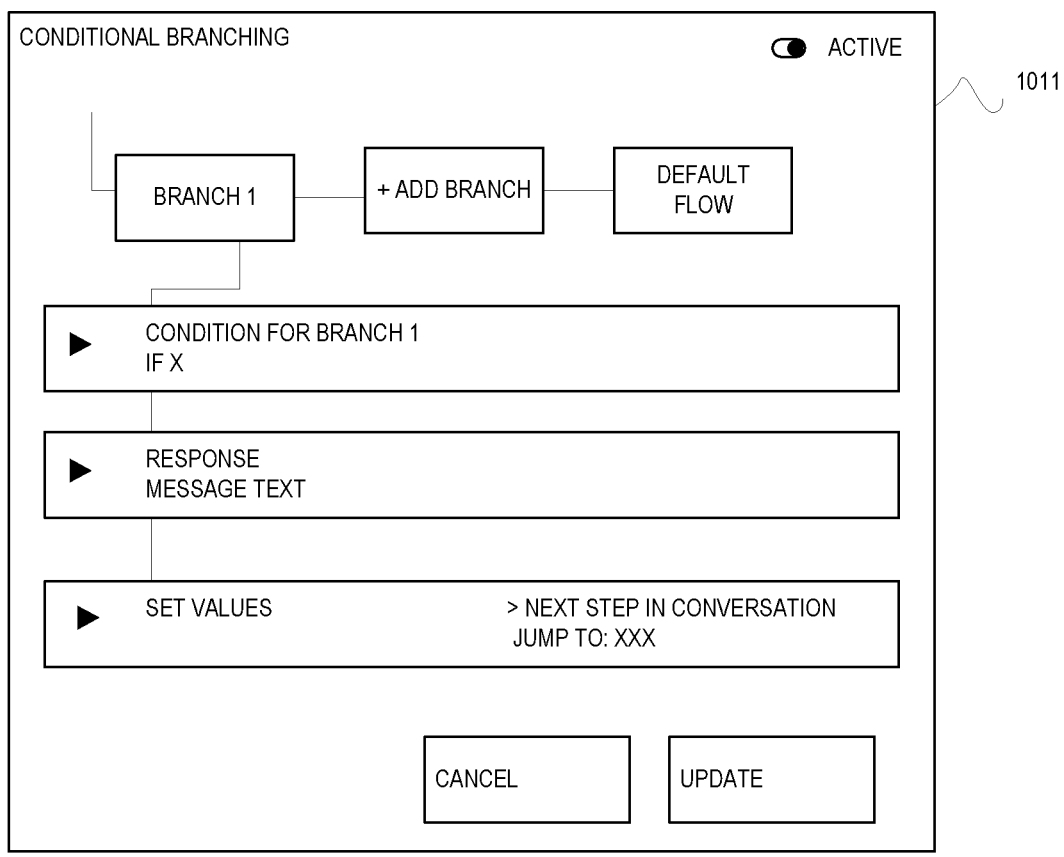
FIG. 12 illustrates examples of a conditional branching GUI to edit conditional branching of an intent.

In some examples, as noted before, one or more of these sections allow a user to define code hooks and/or conditionals. FIGS. 10-12 illustrate examples of one or more graphical user interfaces for inputting code hooks and/or conditionals.

FIG. 10 illustrates examples of a generic section of GUI to edit an intent. In this section 1001, a user may make the section active or inactive, provide response information, set values, add conditional branching, and/or provide dialog code hook information.

A field 1003 allows a user to provide a response message text.

A field 1005 allows a user to set values and set a next step in a conversation. For example, the next step may be a jump to: 1) Initial Response; 2) Slot Elicitation; 3) Confirmation Prompt; 4) Fulfillment; 5) Evaluate Condition; 6) Execute dialog code hook; 7) Error block; or 8) Closing response. For example, the next step may be a switch to: 1) an intent; 2) an intent at a specific slot; 3) return to a previous slot; 4) transfer to an agent; 5) continue conversation; and/or 5) end conversation.

An add conditional branching component 1011 allows a user to add or edit one or more conditionals.

A dialog code hook component 1021 allows a user to point to and/or enable a code hook via 1023 and/or configure code hook success, failure, and timeout responses using field 1025.

The GUI allows a user to cancel changes 1033 and/or update the section 1031.

FIG. 11 illustrates examples of a conditional branching GUI to edit conditional branching of an intent. In some examples, this is entered via 1011. As shown, a user may add one or more branches, set a response, and set values of what to do for the branch and/or default flow. In this example, there is no branch and the default flow is used. The user may set values for the default flow and a next step. For example, the next step may be a jump to: 1) Initial Response; 2) Slot Elicitation; 3) Confirmation Prompt; 4) Fulfillment; 5) Evaluate Condition; 6) Execute dialog code hook; 7) Error block; or 8) Closing response. For example, the next step may be a switch to: 1) an intent; 2) an intent at a specific slot; 3) return to a previous slot; 4) transfer to an agent; 5) continue conversation; and/or 5) end conversation.

FIG. 12 illustrates examples of a conditional branching GUI to edit conditional branching of an intent. In some examples, this is entered via 1011. As shown, a user may add one or more branches, set a response, and set values of what to do for the branch and/or default flow. In this example, there is first branch has been added. The user may set one or more conditions for the branch. The user may also set values for the branch flow and a next step. For example, the next step may be a jump to: 1) Initial Response; 2) Slot Elicitation; 3) Confirmation Prompt; 4) Fulfillment; 5) Evaluate Condition; 6) Execute dialog code hook; 7) Error block; or 8) Closing response. For example, the next step may be a switch to: 1) an intent; 2) an intent at a specific slot; 3) return to a previous slot; 4) transfer to an agent; 5) continue conversation; and/or 5) end conversation.

In some examples, existing next actions are overwritten as a user is editing the bot (e.g., slot priority change confirmation prompt marked inactive). A default next action at each conversation step is the next action that the auto updating logic will generate if the next action was missing, at every user action, in some examples, there will be three groups of conversation steps that might need a new next action: 1) the conversation step that was changed (the next action of the step that was changed will be overwritten only if it was pointing to its default action); 2) the conversation steps that pointed to the step that was changed before the change (the next action of these conversation steps will be changed to their default action); and/or 3) the conversation step that precedes (but not necessarily pointing to) conversation step that was changed (the next action of these conversation steps will be changed to their default action only if they were pointing to the default action prior to the change).

Figure 13:
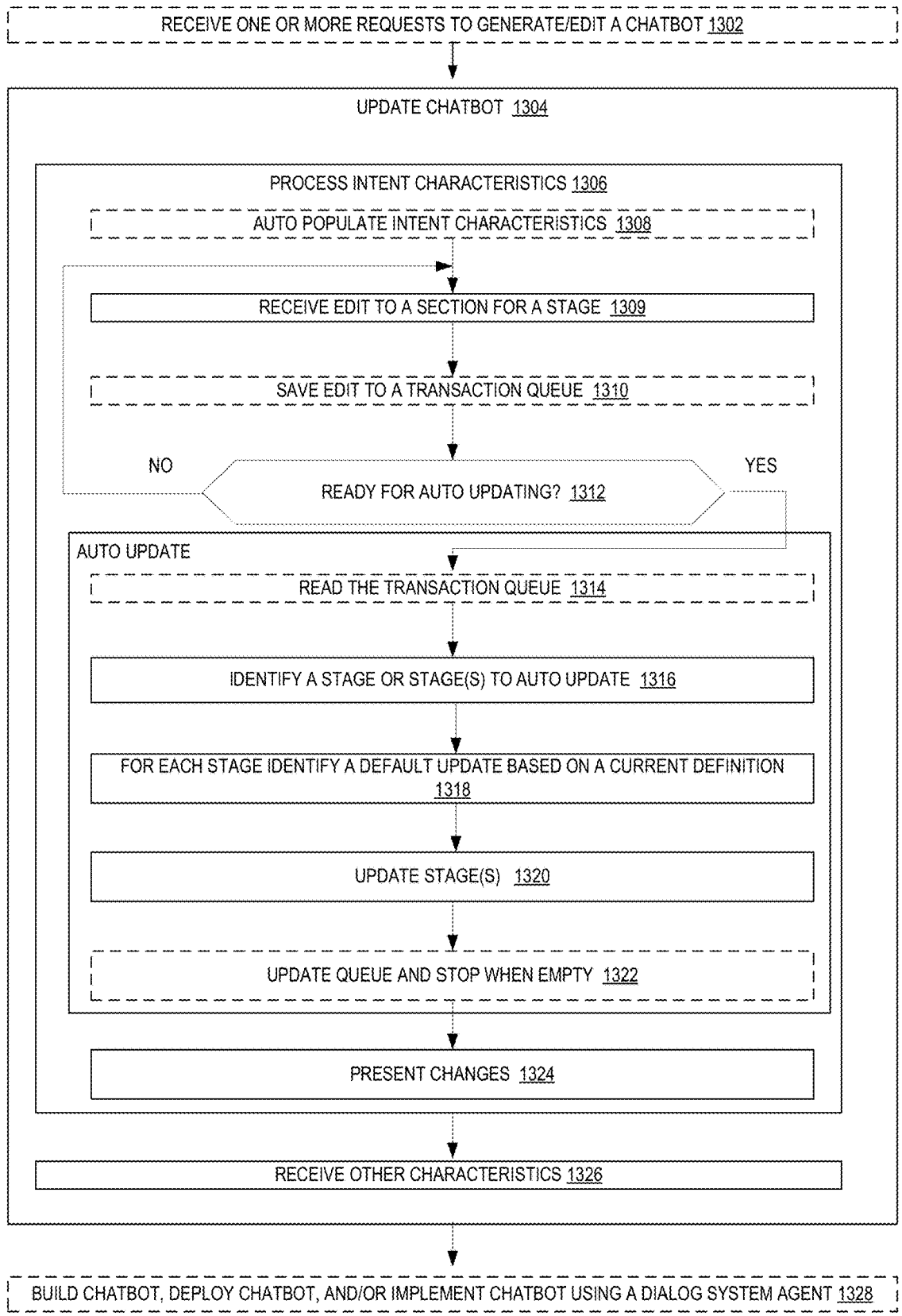
FIG. 13 is a flow diagram illustrating operations of a method for designing and/or using a chatbot having conditionals according to some examples.

FIG. 13 is a flow diagram illustrating operations of a method for designing and/or using a chatbot having conditionals according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the chatbot developer service 221 and/or the dialog system agent 223 of the other figures.

One or more requests to generate/edit a chatbot are received at 1302. In some examples, the one or more requests include one or more of: an indication of a creation method to use (e.g., start from a template or example, start from scratch, import from an existing chatbot, etc.), a name for the chatbot, a description of the chatbot, an indication of a type of user that has access to the chatbot, an user session idle timeout value, one or more tags to help identify the chatbot, an indication of a language the chatbot will use, characteristics for the chatbot (e.g., intent characteristics, slot types (including resolution, values, etc.), etc.), an indication of where to store a generated/edited chatbot, etc. In particular, the update to the chatbot is to its definition.

A chatbot is updated at 1304. In some examples, the updating of a chatbot includes a plurality of actions. In particular, when using a graphical user interface several different aspects of an intent, etc. are input which then causes an update to a chatbot's definition.

Intent characteristics of the chatbot are processed at 1306. In some examples, the intent characteristics for a chatbot flow include one or more of: intent details, contexts, one or more sample utterances, and stages such an initial response stage, a slot elicitation stage (to elicit one or more slots (including slot types and prompts)), confirmation prompts and decline responses stage, fulfillment stage (including messages to send upon failure and success), and/or a closing stage (to provide text to send when closing). In some examples, one or more of the intent characteristics includes, per step or stage in the chatbot flow, sub-intent characteristics such as one or more of values to set, an indication of priority (e.g., where in the GUI a particular slot is) an indication of a next step in a conversation to jump to, one or more conditional branches, an indication of one or more dialog code hooks to utilize, and/or an indication of if the characteristic or sub-characteristic (e.g., code hook, conditional branch, flow step itself, etc.) is active.

In some examples, at least some intent characteristics are auto populated at 1308. For example, default next steps are inserted, a user provided bot definition is loaded into a graphical user interface, a bot template (from a bot definition) is loaded into a graphical user interface, etc.

In some examples, an edit to a section for a stage in the flow is received at 1309. For example, a conditional is configured, or a slot priority is changed, etc.

In some examples, the edit is saved to a transaction queue at 1310. This queue stores edits that are pending to be made.

In some examples, the queue is a first in, first out (FIFO) queue. In some examples, the queue is a last in, first out (LIFO) queue.

Edits are made to the chatbot's definition. In some examples, a determination of if those edits are ready to be made and therefore cause an auto updating for the chatbot is made at 1312. In some examples, the determination is the receipt of a save change indication. In some examples, a receipt of cancel change indication is used to flush one or more edits from the transaction queue (those edits that should not occur).

If yes, then auto updating occurs. In particular, in auto updating, the underlying chatbot definition is updated to reflect the one or more user edits and predict a next step to be reflected in the chatbot definition. If not, then a wait for a next edit to be made occurs.

The transaction queue is read at 1314 to pull out at least one transaction (edit) to make. One or more stages to modify are identified at 1316. For each stage, a default update is identified based on the current chatbot definition at 1318.

The chatbot flow (as defined by the chatbot definition) is updated at 1320 causing an auto updating such as connecting to next stage in the flow (e.g., as identified-some of which may be explicit) and/or actions (within a stage in the flow). In some examples, the auto updating follows rules. Examples of rules are as follows.

Initial Response Rules
1) If a next action is not present, determine if a dialog hook or conditional is present
   a. If both are present, the next action should be the conditional followed by the dialog hook.
   b. If only the conditional is present, the next action should be the conditional.
   c. If only the conditional is present, the next action should be the dialog hook.
   d. If neither is present, the next action is the next step in the flow (e.g., first slot to elicit).
2) If the next action is a dialog code hook or conditional, then no change is needed
3) If the current GUI action was a slot reshuffle, slot deletion, or a toggle between a slot being mandatory and option, then the next action is elicit slot for the highest priority slot.
4) Otherwise, no change.

Dialog Code Hook Initial Response
1) Success is the same as the initial response.
2) If failure is null, then end conversation.
3) If failure is not null, then no change is made.
4) If timeout is null, then end conversation.
5) If timeout is not null, then no change is made.

Slot Elicitation Branches to Two Next Steps
1) Slot Capture Success Response, the next action is the same as initial response.
2) Slot Capture Failure Response, the next action is the to switch intent to a fallback intent.

Dialog Code Hook Branches to Two Next Steps
1) Dialog code hook success response, the next step is set according to:
   a. If a slot with a lower priority exits, that slot is the next step
   b. Else if a confirmation prompt is defined, confirm intent is the next step
   c. Else fulfill
2) Dialog code hook success response, the next step is close conversation.

Confirmation Prompt Branches to Two Next Steps
1) Confirmation success, the next step is fulfill.
2) Declination response, the next step is end conversation.
3) Failure, the next step is switch intent.

Fulfillment with Branch into Three Next Steps
1) Fulfillment success response, the next step is closing.
2) Fulfillment failure response, the next step is end conversation (bypassing closing).
3) Fulfillment timeout response, the next step is end conversation (bypassing closing)

Closing Response
1) The next step is end conversation.

In some examples, the queue is updated (to reflect removed transactions) and the auto updating process stops when the queue is empty at 1322

The changes made to the chatbot (by updating the bot definition) are presented to the user at 1324.

Other characteristics are received at 1326. For example, adding/editing slot types, configuring testing, etc.

The chatbot is built (e.g., the bot definition is used to generate one or more ML artifacts and the, deployed and/or implemented using a dialog system agent for inferencing at 1328 in some examples.

Figure 14:
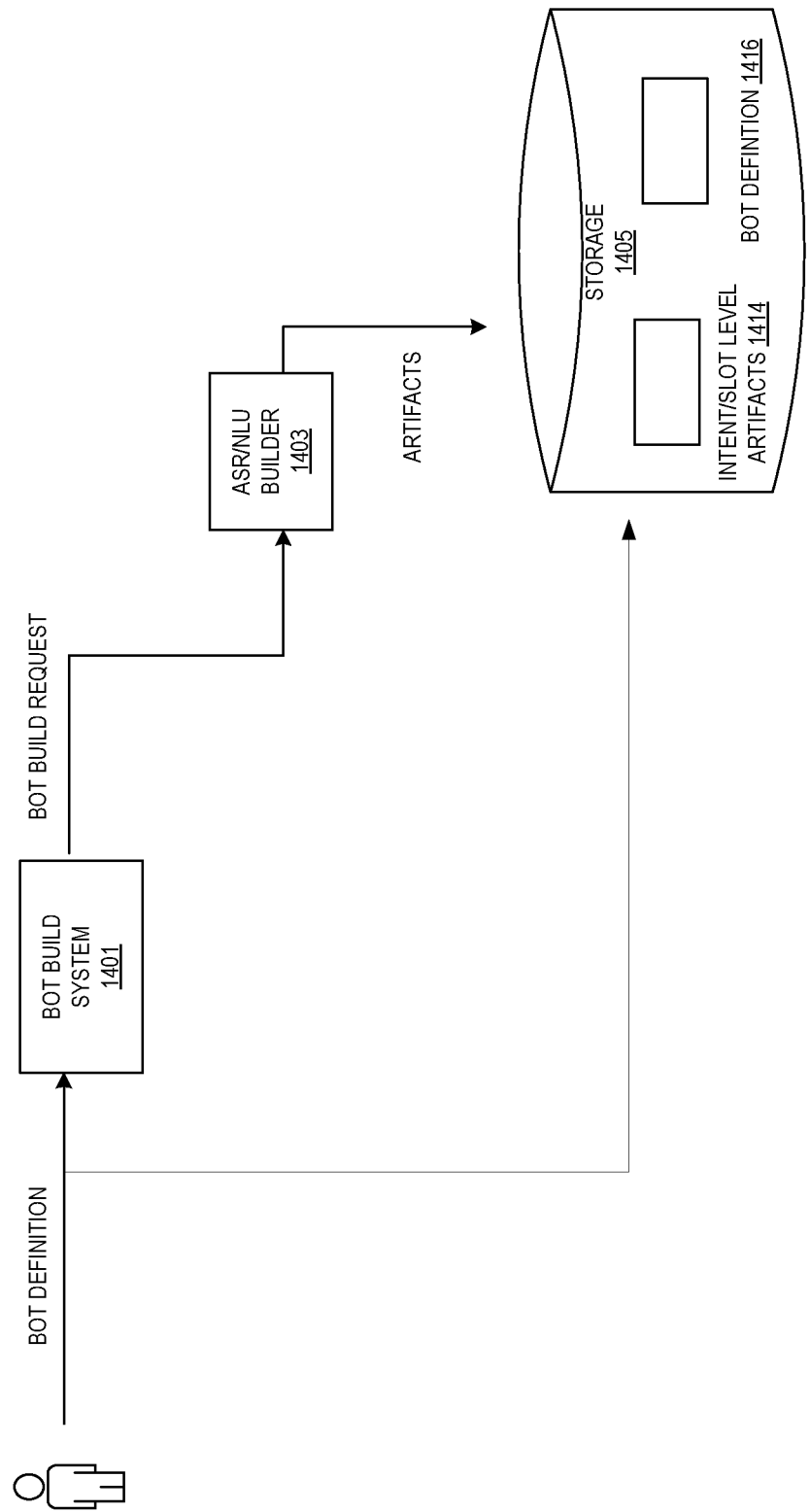
FIG. 14 illustrates examples of building artifacts using the chatbot developer service 221.

FIG. 14 illustrates examples of building artifacts using the chatbot developer service 221. A bot developer provides a bot definition to a bot build system 1401 that is a part of the chatbot developer service 221. The bot definition includes one or more of intents, slots, sample utterances, slot values and custom vocab. In some examples, the bot definition is in a JavaScript Object Notation (JSON) format.

The bot build system 1401 may be a hosted service of a provider network. The bot build system 1401 is responsible for one or more acts to build a bot including, as a part of a bot build request, the calling for the building of ASR or NLU artifacts using ASR/NLU builder 1403. Note the ASR builder 1403 may also be provided service or a part of the bot build system 1401.

The ASR/NLU builder 1403 generates artifacts including intent/slot level artifacts 1414.

Storage 1405 stores the intent/slot level artifacts 1414 and the bot definition 1416.

Figure 15:
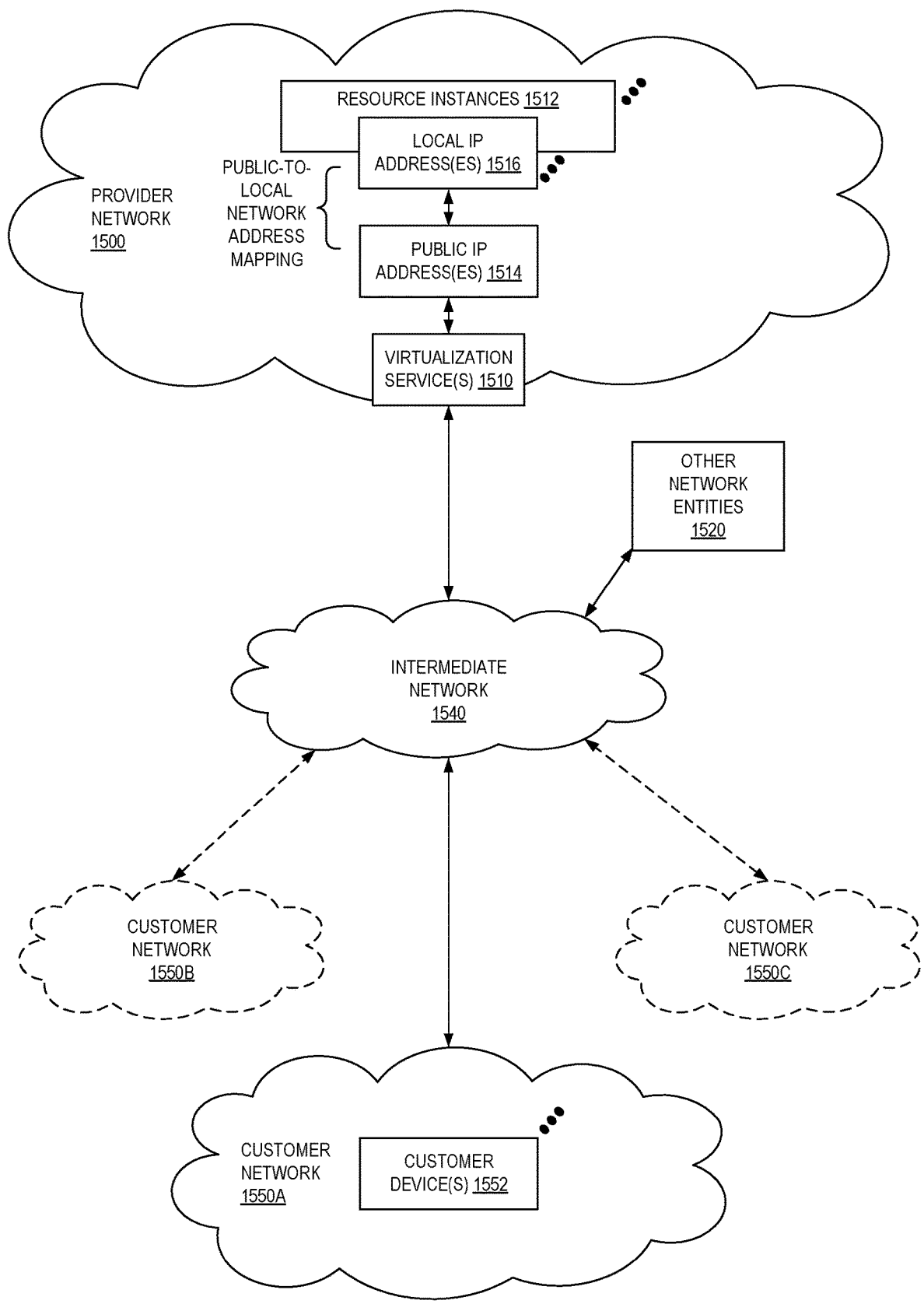
FIG. 15 illustrates an example provider network environment according to some examples.

FIG. 15 illustrates an example provider network (or "service provider system") environment according to some examples. A provider network 1500 can provide resource virtualization to customers via one or more virtualization services 1510 that allow customers to purchase, rent, or otherwise obtain instances 1512 of virtualized resources, including but not limited to computation and storage resources, implemented on devices within the provider network or networks in one or more data centers. Local Internet Protocol (IP) addresses 1516 can be associated with the resource instances 1512; the local IP addresses are the internal network addresses of the resource instances 1512 on the provider network 1500. In some examples, the provider network 1500 can also provide public IP addresses 1514 and/or public IP address ranges (e.g., Internet Protocol version 4 (IPv4) or Internet Protocol version 6 (IPv6) addresses) that customers can obtain from the provider 1500.

Conventionally, the provider network 1500, via the virtualization services 1510, can allow a customer of the service provider (e.g., a customer that operates one or more customer networks 1550A-1550C (or "client networks") including one or more customer device(s) 1552) to dynamically associate at least some public IP addresses 1514 assigned or allocated to the customer with particular resource instances 1512 assigned to the customer. The provider network 1500 can also allow the customer to remap a public IP address 1514, previously mapped to one virtualized computing resource instance 1512 allocated to the customer, to another virtualized computing resource instance 1512 that is also allocated to the customer. Using the virtualized computing resource instances 1512 and public IP addresses 1514 provided by the service provider, a customer of the service provider such as the operator of the customer network(s) 1550A-1550C can, for example, implement customer-specific applications and present the customer's applications on an intermediate network 1540, such as the Internet. Other network entities 1520 on the intermediate network 1540 can then generate traffic to a destination public IP address 1514 published by the customer network(s) 1550A-1550C; the traffic is routed to the service provider data center, and at the data center is routed, via a network substrate, to the local IP address 1516 of the virtualized computing resource instance 1512 currently mapped to the destination public IP address 1514. Similarly, response traffic from the virtualized computing resource instance 1512 can be routed via the network substrate back onto the intermediate network 1540 to the source entity 1520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1500; a customer can then assign their allocated public IP addresses to particular resource instances allocated to the customer. These public IP addresses can be referred to as customer public IP addresses, or simply customer IP addresses. Instead of being assigned by the provider network 1500 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 16:
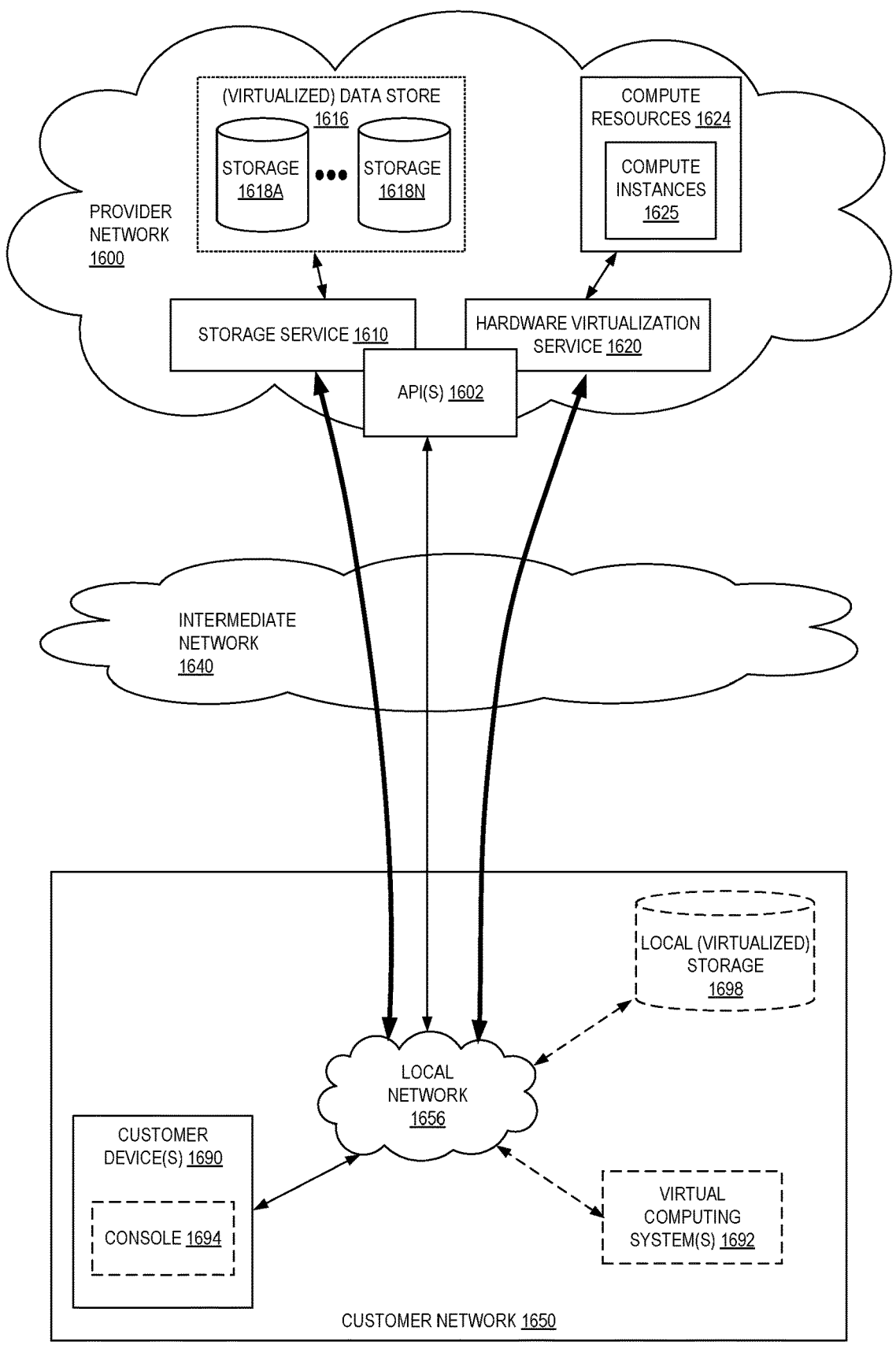
FIG. 16 is a block diagram of an example provider network that provides a storage service and a hardware virtualization service to customers according to some examples.

FIG. 16 is a block diagram of an example provider network environment that provides a storage service and a hardware virtualization service to customers, according to some examples. A hardware virtualization service 1620 provides multiple compute resources 1624 (e.g., compute instances 1625, such as VMs) to customers. The compute resources 1624 can, for example, be provided as a service to customers of a provider network 1600 (e.g., to a customer that implements a customer network 1650). Each computation resource 1624 can be provided with one or more local IP addresses. The provider network 1600 can be configured to route packets from the local IP addresses of the compute resources 1624 to public Internet destinations, and from public Internet sources to the local IP addresses of the compute resources 1624.

The provider network 1600 can provide the customer network 1650, for example coupled to an intermediate network 1640 via a local network 1656, the ability to implement virtual computing systems 1692 via the hardware virtualization service 1620 coupled to the intermediate network 1640 and to the provider network 1600. In some examples, the hardware virtualization service 1620 can provide one or more APIs 1602, for example a web services interface, via which the customer network 1650 can access functionality provided by the hardware virtualization service 1620, for example via a console 1694 (e.g., a web-based application, standalone application, mobile application, etc.) of a customer device 1690. In some examples, at the provider network 1600, each virtual computing system 1692 at the customer network 1650 can correspond to a computation resource 1624 that is leased, rented, or otherwise provided to the customer network 1650.

From an instance of the virtual computing system(s) 1692 and/or another customer device 1690 (e.g., via console 1694), the customer can access the functionality of a storage service 1610, for example via the one or more APIs 1602, to access data from and store data to storage resources 1618A-1618N of a virtual data store 1616 (e.g., a folder or "bucket," a virtualized volume, a database, etc.) provided by the provider network 1600. In some examples, a virtualized data store gateway (not shown) can be provided at the customer network 1650 that can locally cache at least some data, for example frequently accessed or critical data, and that can communicate with the storage service 1610 via one or more communications channels to upload new or modified data from a local cache so that the primary store of data (the virtualized data store 1616) is maintained. In some examples, a user, via the virtual computing system 1692 and/or another customer device 1690, can mount and access virtual data store 1616 volumes via the storage service 1610 acting as a storage virtualization service, and these volumes can appear to the user as local (virtualized) storage 1698.

While not shown in FIG. 16, the virtualization service(s) can also be accessed from resource instances within the provider network 1600 via the API(s) 1602. For example, a customer, appliance service provider, or other entity can access a virtualization service from within a respective virtual network on the provider network 1600 via the API(s)

1602 to request allocation of one or more resource instances within the virtual network or within another virtual network.

Illustrative Systems

Figure 17:
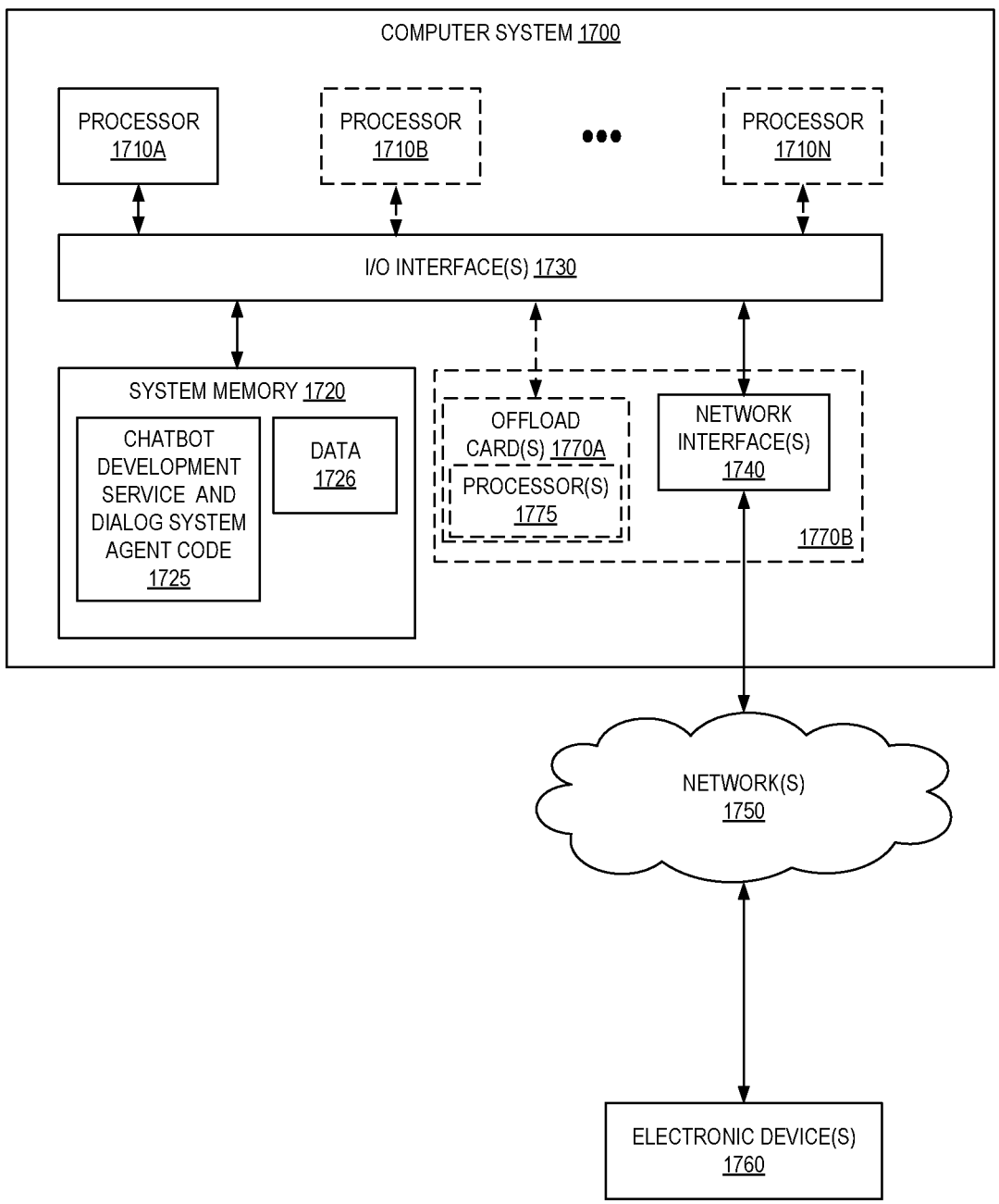
FIG. 17 is a block diagram illustrating an example computer system that can be used in some examples.

In some examples, a system that implements a portion or all of the techniques described herein can include a general-purpose computer system, such as the computer system 1700 illustrated in FIG. 17, that includes, or is configured to access, one or more computer-accessible media. In the illustrated example, the computer system 1700 includes one or more processors 1710 coupled to a system memory 1720 via an input/output (I/O) interface 1730. The computer system 1700 further includes a network interface 1740 coupled to the I/O interface 1730. While FIG. 17 shows the computer system 1700 as a single computing device, in various examples the computer system 1700 can include one computing device or any number of computing devices configured to work together as a single computer system 1700.

In various examples, the computer system 1700 can be a uniprocessor system including one processor 1710, or a multiprocessor system including several processors 1710 (e.g., two, four, eight, or another suitable number). The processor(s) 1710 can be any suitable processor(s) capable of executing instructions. For example, in various examples, the processor(s) 1710 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1710 can commonly, but not necessarily, implement the same ISA.

The system memory 1720 can store instructions and data accessible by the processor(s) 1710. In various examples, the system memory 1720 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1720 as chatbot development service and dialog system agent service code 1725 (e.g., executable to implement, in whole or in part, the chatbot development service 221 and dialog system agent service 223) and data 1726.

In some examples, the I/O interface 1730 can be configured to coordinate I/O traffic between the processor 1710, the system memory 1720, and any peripheral devices in the device, including the network interface 1740 and/or other peripheral interfaces (not shown). In some examples, the I/O interface 1730 can perform any necessary protocol, timing, or other data transformations to convert data signals from one component (e.g., the system memory 1720) into a format suitable for use by another component (e.g., the processor 1710). In some examples, the I/O interface 1730 can include support for devices attached through various types of peripheral buses, such as a variant of the Peripheral Component Interconnect (PCI) bus standard or the Universal Serial Bus (USB) standard, for example. In some examples, the function of the I/O interface 1730 can be split into two or more separate components, such as a north bridge and a south bridge, for example. Also, in some examples, some or all of the functionality of the I/O interface 1730, such as an interface to the system memory 1720, can be incorporated directly into the processor 1710.

The network interface 1740 can be configured to allow data to be exchanged between the computer system 1700 and other devices 1760 attached to a network or networks 1750, such as other computer systems or devices as illustrated in FIG. 1, for example. In various examples, the network interface 1740 can support communication via any suitable wired or wireless general data networks, such as types of Ethernet network, for example. Additionally, the network interface 1740 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1700 includes one or more offload cards 1770A or 1770B (including one or more processors 1775, and possibly including the one or more network interfaces 1740) that are connected using the I/O interface 1730 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1700 can act as a host electronic device (e.g., operating as part of a hardware virtualization service) that hosts compute resources such as compute instances, and the one or more offload cards 1770A or 1770B execute a virtualization manager that can manage compute instances that execute on the host electronic device. As an example, in some examples the offload card(s) 1770A or 1770B can perform compute instance management operations, such as pausing and/or un-pausing compute instances, launching and/or terminating compute instances, performing memory transfer/copying operations, etc. These management operations can, in some examples, be performed by the offload card(s) 1770A or 1770B in coordination with a hypervisor (e.g., upon a request from a hypervisor) that is executed by the other processors 1710A-1710N of the computer system 1700. However, in some examples the virtualization manager implemented by the offload card(s) 1770A or 1770B can accommodate requests from other entities (e.g., from compute instances themselves), and cannot coordinate with (or service) any separate hypervisor.

In some examples, the system memory 1720 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1700 via the I/O interface 1730. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1700 as the system memory 1720 or another type of memory. Further, a computer-accessible medium can include transmission media or signals such as electrical, electromagnetic, or digital signals, conveyed via a communication medium such as a network and/or a wireless link, such as can be implemented via the network interface 1740.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim, or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
    receiving one or more requests to generate a chatbot having at least one conditional branching condition;
    generating the chatbot having at least one conditional branching condition by at least:
        processing intent characteristics by:
            receiving an edit to intent characteristics for a stage of a plurality of stages in a chatbot flow,
            identifying a stage to modify based on at least the received edit,
            modifying the stage based on at least the received edit,
            identifying, for the stage, a default update rule based on a present chatbot definition, wherein the identified default update rule is one of a plurality of default update rules, each default update rule of the plurality of default update rules being associated with a type of stage of the plurality of stages, and
            based at least in part on the received edit, automatically updating the identified stage in the chatbot definition, to indicate a next step determined-inferred according to one or more rules for the stage including the identified default update rule;
        presenting the updated chatbot definition in a graphical user interface; and
        building the chatbot based at least in part on the updated chatbot definition.

2. The computer-implemented method of claim 1, wherein the stages of the chatbot flow for an intent includes one or more of an initial response stage, a slot elicitation stage to collect details from a user for the intent, a confirmation prompt and decline response stage to allow a user to confirm the collected details, a fulfillment stage to perform actions for the user, and a closing response stage to provide an indication the intent is complete.

3. The computer-implemented method of claim 1, wherein, per stage, editable sub-intent characteristics include at least one of: one or more of values to set, an indication of a next step in a conversation to jump to, one or more conditional branches, an indication of one or more dialog code hooks to utilize, and/or an indication of if the characteristic or sub-characteristic is active.

4. A computer-implemented method comprising:
    updating a chatbot definition by:
        receiving an edit to intent characteristics for a stage of a plurality of stages in a chatbot flow,
        identifying a stage to modify based on at least the received edit,
        modifying the stage based at least on the received edit,
        identifying, for the stage, a default update rule based on the chatbot definition, wherein the identified default update rule is one of a plurality of default update rules, each default update rule of the plurality of default update rules being associated with a type of stage of the plurality of stages, and
        based at least in part on the received edit, automatically updating the stage in the chatbot definition to indicate a next step determined according to one or more rules for the stage including the identified default update rule; and
    presenting the updated chatbot definition in a graphical user interface.

5. The computer-implemented method of claim 4, wherein the stages of the chatbot flow for an intent includes one or more of an initial response stage, a slot elicitation stage to collect details from a user for the intent, a confirmation prompt and decline response stage to allow a user to confirm the collected details, a fulfillment stage to perform actions for the user, and a closing response stage to provide an indication the intent is complete.

6. The computer-implemented method of claim 5, wherein the slot elicitation stage includes a plurality of slots and an order of the slots and an update to the order of the slots is an edit to the intent characteristics.

7. The computer-implemented method of claim 6, wherein the slot elicitation stage includes at least one slot, each slot including a slot type and a prompt.

8. The computer-implemented method of claim 4, wherein one or more of the stages of the chatbot flow are capable of being made active or inactive.

9. The computer-implemented method of claim 4, wherein conditionals and code hooks of a stage are capable of being made active or inactive.

10. The computer-implemented method of claim 8, wherein a stage that is marked as inactive is tracked for subsequent usage.

11. The computer-implemented method of claim 4, wherein, per stage, editable sub-intent characteristics include at least one of: one or more of values to set, an indication of a next step in a conversation to jump to, one or more conditional branches, an indication of one or more dialog code hooks to utilize, and/or an indication of if the characteristic or sub-characteristic is active.

12. The computer-implemented method of claim 4, wherein received updates are tracked using a queue of edit transactions to process.

13. The computer-implemented method of claim 4, wherein the chatbot definition includes at least one conditional branch that includes a default branch and one or more conditions for a non-default branch.

14. The computer-implemented method of claim 4, further comprising:
building and deploying the updated chatbot; and
performing inference with the chatbot using a dialog policy manager.

15. The computer-implemented method of claim 4, further comprising:
receiving an indication from a user to perform the updating.

16. A system comprising:
a first one or more electronic devices to implement a chatbot service to host an updated chatbot in a multi-tenant provider network; and
a second one or more electronic devices to implement a chatbot development service in the multi-tenant provider network, the chatbot development service including instructions that upon execution cause the chatbot development service to:
update a chatbot definition by:
receiving an edit to intent characteristics for a stage of a plurality of stages in a chatbot flow,
identifying a stage to modify based on at least the received edit,
modifying the stage based on at least the received edit,
identifying, for the stage, a default update rule based on the chatbot definition, wherein the identified default update rule is one of a plurality of default update rules, each default update rule of the plurality of default update rules being associated with a type of stage of the plurality of stages, and
based at least in part on the received edit, automatically updating the stage in the chatbot definition to indicate a next step determined according to one or more rules for the stage including the identified default update rule, and
present the updated chatbot definition in a graphical user interface.

17. The system of claim 16, wherein the stages of the chatbot flow for an intent includes one or more of an initial response stage, a slot elicitation stage to collect details from a user for the intent, a confirmation prompt and decline response stage to allow a user to confirm the collected details, a fulfillment stage to perform actions for the user, and a closing response stage to provide an indication the intent is complete.

18. The system of claim 17, wherein the slot elicitation stage includes a plurality of slots and an order of the slots and an update to the order of the slots is an edit to the intent characteristics.

19. The system of claim 16, wherein one or more of the stages of the chatbot flow are capable of being made active or inactive.

20. The system of claim 16, wherein conditionals and code hooks of a stage are capable of being made active or inactive.

* * * * *